United States Patent [19]

Andren et al.

[11] 4,392,232

[45] Jul. 5, 1983

[54] SIMPLIFIED TRANSVERSAL CORRELATOR FOR MSK AND MSK RELATED WAVEFORMS

[75] Inventors: Carl F. Andren, Indiatlantic; William H. Mosley, Jr., St. Petersburg, both of Fla.

[73] Assignee: B-Systems, Inc., Dallas, Tex.

[21] Appl. No.: 306,490

[22] Filed: Sep. 28, 1981

[51] Int. Cl.³ .................. H04L 27/06; H04L 27/22; G06F 15/34

[52] U.S. Cl. ............................. 375/86; 364/728; 375/96

[58] Field of Search .............. 375/39, 53, 54, 77, 375/86, 96, 1, 2.1, 2.2, 57, 58; 364/486, 728; 329/112, 124; 370/12, 18

[56] References Cited

U.S. PATENT DOCUMENTS

| | | | |
|---|---|---|---|
| 3,440,548 | 4/1969 | Saltzberg | 328/151 |
| 3,742,360 | 6/1973 | Ragsdale | 375/14 |
| 3,971,996 | 7/1976 | Motley et al. | 328/155 |
| 3,997,772 | 12/1976 | Crochiere et al. | 328/155 |
| 4,038,540 | 7/1977 | Roberts | 375/96 |
| 4,099,075 | 7/1978 | Goldberg et al. | 307/352 |
| 4,164,036 | 8/1979 | Wax | 364/486 |
| 4,293,953 | 10/1981 | Gutleber | 375/96 |
| 4,313,203 | 1/1982 | Gerwen et al. | 370/18 |

Primary Examiner—Benedict V. Safourek
Attorney, Agent, or Firm—Robert V. Wilder; Albert M. Crowder, Jr.

[57] ABSTRACT

A transversal correlator is disclosed for demodulating a phase shift keyed (PSK) signal. The PSK signal is mixed with a local oscillator signal to produce quadrature I-channel and Q-channel signals. The I-channel and Q-channel signals are sampled at a periodic rate and the samples are propagated through a shift register for each channel. A preselected pseudo noise signal is stored in a local register which has an output tap for each stage. Each of the analog shift registers has a stage corresponding to one of the stages of the local register. Each of the I-channel and Q-channel samples is multiplied by the binary state in the corresponding stage of the local register. This multiplying operation produces a plurality of product signals. Product signals for alternate samples of the I-channel signal are summed with alternate but offset samples of the Q-channel signal to produce a first summation signal. The remaining alternate samples of the I-channel and Q-channel signals are also summed to produce a second summation signal. The first and second summation signals are full wave rectified then summed to produce a correlation output signal.

14 Claims, 4 Drawing Figures

SIMPLIFIED TRANSVERSAL CORRELATOR FOR MSK AND MSK RELATED WAVEFORMS

The U.S. government has rights in this invention pursuant to contract No. F30602-78-C-0066 awarded by the Department of the Air Force.

FIELD OF THE INVENTION

The present invention pertains to information transmission and more particularly to a method and apparatus for transversal correlation of MSK (M-ary shift keyed) related waveforms.

BACKGROUND OF THE INVENTION

Digital data transmission has been carried out with various forms of modulation. The particular modulation format which is used in a system impacts the spectrum occupancy of the transmitted signal and the equipment complexity for both the modulator and demodulator. Ordinary bi-phase phase shift keying (BPSK) modulation is noted for its wide spectrum occupancy because of its instantaneous phase transitions. The phase transitions cannot be removed by filtering if the signal is subsequently to be processed by non-linear transmitter stages. However, a BPSK waveform can be demodulated with a relatively simple correlator circuit. Staggered quadraphase phase shift keying (SQPSK) modulation has been utilized to alleviate this problem. The use of SQPSK results in a more complex transversal correlator since the transversal correlator must identify whether the pseudo noise (PN) modulation data stream is to be found in the in-phase (I) or quadrature-phase (Q) channel for each of the two independent data streams which are transmitted in the I or Q channels. For SQPSK modulation four parallel traversal correlators are required to properly demodulate an incoming signal with arbitrary phase.

The principle problem with BPSK modulation is that it contains no energy at other than 0 degree and 180 degree phase angles. Therefore, there is no phase rotation to permit a follow-up filter to provide a smooth phase rotation. Without a phase rotation, there must be an amplitude collapse in order to change the phase state. This amplitude collapse causes spectrum spreading in class C transmitting amplifiers or limiting devices. One modification to standard BPSK involves the transitory injection of quadrature energy during a bit transition so that a smooth phase rotation can be achieved. This injection can be produced by the technique illustrated in U.S. Pat. No. 3,173,201 or through the use of the SQPSK technique.

SQPSK modulation has the virtue of greater utilization of the available bandwidth by employing the unused quadrature channel. As a disadvantage, however, the threshold for deciding whether a transmitted bit is a one or a zero, is halved by requiring the system to differentiate 90 degree phase increments rather than 180 degree phase increments for data modulation systems. Further, there is the need for four transversal correlators in a spread spectrum application.

Therefore there exists a need for a method and apparatus for reducing the spectral occupancy of a MSK related signal while using a relatively simple transversal correlator to demodulate the signal.

DISCLOSURE OF THE INVENTION

A transversal correlator is disclosed for demodulating a phase shift keyed (PSK) signal. The correlator includes circuitry for producing quadrature I-channel and Q-channel signals derived from the PSK signal. Circuitry is provided for sampling the I-channel and Q-channel signals to produce sequential samples of the signals. Stored circuitry is provided for storing a plurality of the samples for each of the I and Q-channel signals. Other storage circuitry is provided for storing a plurality of bits comprising a selected digital code sequence. Correlation circuitry is included for correlating the digital sequence with alternate samples of the I and Q channel signals which are stored in the storage circuitry to produce a first summation signal. Further correlation circuitry is provided for correlating the digital sequence with the remaining alternate samples of the I and Q channel signals which are stored in the storage circuitry to produce a second summation signal. A summation circuit is provided for combining the first and second summation signals to produce a correlation output signal when the stored digital sequence correlates with either or both of the I-channel and Q-channel signals.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
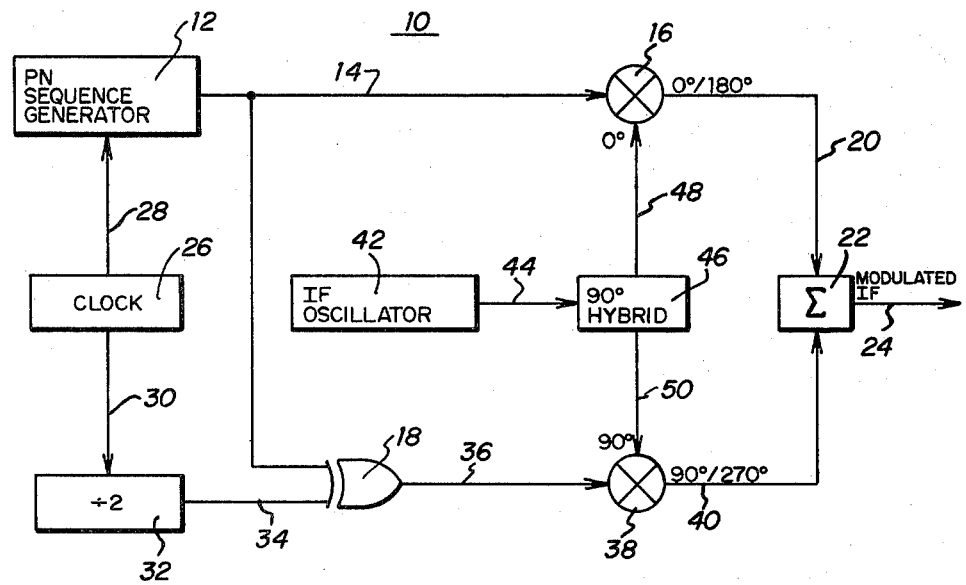
FIG. 1 is a block-schematic diagram of a modulator for producing alternate BPSK modulation in accordance with the present invention.

Referring now to FIG. 1, an alternate BPSK modulator 10 includes a pseudo noise (PN) sequence generator 12 which produces a pseudo noise serial binary data string. The PN signal produced by generator 12 is transmitted through a line 14 to the first input of a mixer 16 and the first input of an exclusive OR gate 18. The output of mixer 16 is transmitted through line 20 to a summation circuit 22 which generates a modulated intermediate frequency (IF) signal on output line 24.

A clock signal generator 26 produces a clock signal which is supplied through line 28 to the PN sequence generator 12 and through line 30 to a divide-by-two circuit 32. The output of divide-by-two circuit 32 is transmitted through line 34 to the second input of exclusive OR gate 18. The logic output of gate 18 is transmitted through line 36 to a first input to a mixer 38. The product signal of mixer 38 is transmitted through line 40 to the second input of the summation circuit 22.

An IF oscillator 42 generates an IF signal which is transmitted through line 44 to the input of a 90 degree hybrid circuit 46. A first output of hybrid 46 is transmitted through line 48 to the second input of mixer 16. A second output of hybrid 46, offset 90 degrees from the first output, is transmitted through line 50 to the second input of mixer 38.

Figure 2:
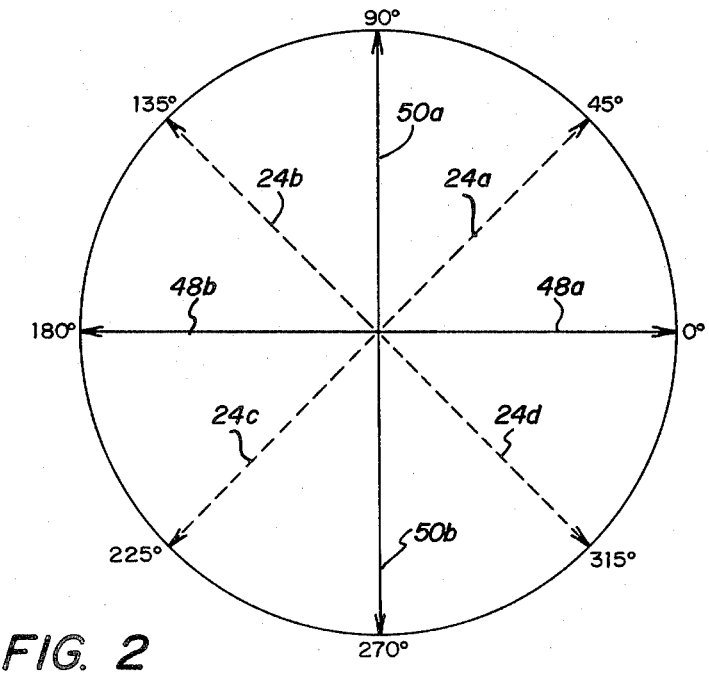
FIG. 2 is a phase diagram illustrating the phase relationships of the various signal components in the ABPSK modulation technique of the present invention.

The operation of alternate BPSK modulator 10 is described in reference to FIGS. 1 and 2. The IF signal on line 48 is defined as the reference having a zero degree phase angle. This is represented as vector 48a in FIG. 2. The output of mixer 16 is either the zero degree vector 48a or the 180 degree vector 48b dependent upon the state of the input signal on line 14. The IF signal on line 50 has a relative phase of 90 degrees which is represented by vector 50a. The output of mixer 38 is a signal having either the phase shown by vector 50a (90°) or that shown by vector 50b (270°) dependent upon the state of the input signal on line 36.

The signals on lines 20 and 40 are summed in circuit 22. The modulated IF signal on output line 24 has the vector states 24a–24d shown in FIG. 2. The various phase outputs produced on line 24 are illustrated in Table 1.

TABLE 1

| Line 20 | Line 40 | Line 24 |
|---------|---------|---------|
| 48a (0°) | 50a (90°) | 24a (45°) |
| 48a (0°) | 50b (270°) | 24d (315°) |
| 48b (180°) | 50a (90°) | 24b (135°) |
| 48b (180°) | 50b (270°) | 24c (225°) |

The modulated IF signal on output line 24 has one of two phases during each bit period. For example, during a first bit period the output can have a phase of either 45 degrees or 225 degrees and during the next bit period the output can have a phase of either 135 degrees or 315 degrees. Therefore, during any bit period there can only be one of two phase states. Further, unlike SQPSK, the phase during any one bit period is not dependent upon the phase at any other bit period.

The IF signal produced on line 24 is translated to RF by conventional techniques if the signal is to be transmitted via a radio link.

Figure 3:
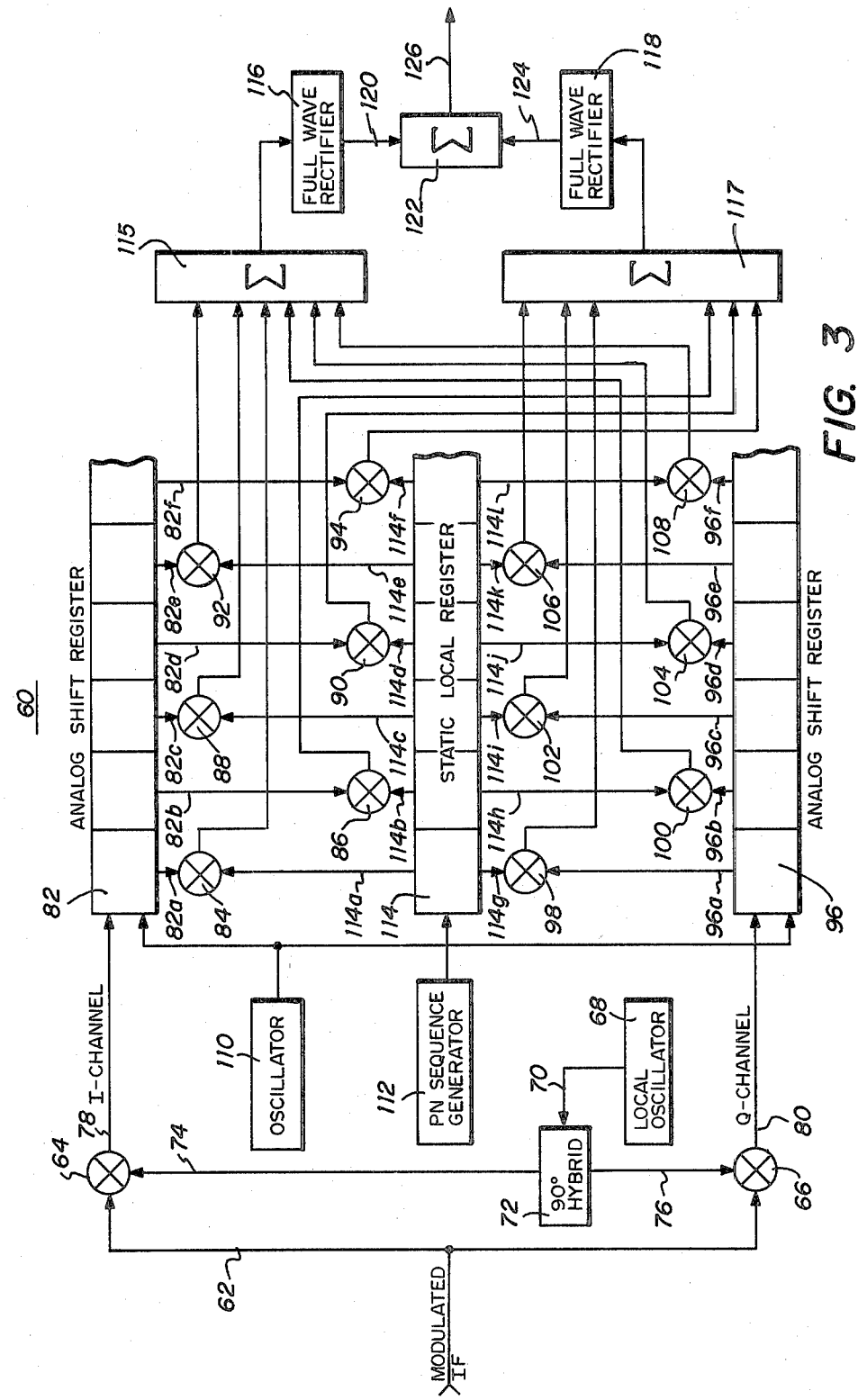
FIG. 3 is a block-schematic diagram of a transversal correlator in accordance with the present invention.

FIG. 3 illustrates a transversal demodulator 60 which operates in accordance with the present invention to demodulate the alternate BPSK signal produced by the modulator circuit shown in FIG. 1 or any equivalent thereto. The alternate BPSK modulated IF signal is input on line 62 to the first inputs of mixers 64 and 66. A local oscillator 68 generates an IF signal which is transmitted through line 70 to a 90 degree hybrid circuit 72. The output signals of circuit 72 are transmitted through lines 74 and 76 respectively to the second inputs of mixers 64 and 66. The signals on line 74 and 76 differ by 90 degrees in phase and for reference purposes the signal on line 74 is assumed to be the reference having a zero degree relative phase. With this reference the output of mixer 64 is defined to be the in-phase (I-channel) signal on line 78 while the quadrature phase (Q-channel) signal from mixer 66 is transmitted through line 80.

The I-channel signal on line 78 is input to an analog shift register 82, which in a preferred embodiment is a model R5401 charge coupled device manufactured by EG & G Reticon Corp. Register 82 has a plurality of parallel output lines 82a–82f. Each of the outputs of register 82 is connected respectively to the first inputs of a plurality of multipliers 84–94.

The Q-channel signal on line 80 is input to a second analog shift register 96 which has a plurality of parallel output lines 96a–96f. Shift register 96 is a similar device to shift register 82. The parallel output lines of shift register 96 are connected respectively to mixers 98–108.

An oscillator 110 is connected to shift registers 82 and 96 for clocking the I and Q-channel signals respectively through the shift registers.

A PN sequence generator 112, similar to the PN sequence generator 12 shown in FIG. 1, is connected to the input of a static local register 114. PN generator 112 produces a replica of the PN signal produced by generator 12 at the modulator. Register 114 is provided with a plurality of output lines 114a–114l with each stage of the register 114 having two outputs therefrom.

The outputs of mixers 84, 88 and 92 are summed together in a summing circuit 115 with the outputs of mixers 100, 104 and 108 with the summation output being provided as the input to a full wave rectifier 116. The outputs of mixers 86, 90 and 94 are combined with the outputs of mixers 98, 102 and 106 in a summing circuit 117 and the summation output is provided as an input to a full wave rectifier 118.

The output signal from rectifier 116 is transmitted through line 120 to a first input of a summation circuit 122. In a like manner the output signal of full wave rectifier 118 is transmitted through a line 124 to a second input of summation circuit 122. The output signal of demodulator 60 is the signal produced on line 126 at the output of summation circuit 122.

Operation of the demodulator circuit 60 is now described in reference to FIG. 3. The modulated IF signal is input to mixers 64 and 66 to produce the baseband I-channel and Q-channel signals. These two signals are input respectively into analog shift registers 82 and 96. The clock signal produced by oscillator 110 shifts the I and Q-channel signals through registers 82 and 96. Oscillator 110 produces a clock signal having at least twice the rate of that of the transmitted PN sequence. The I and Q-channel signals are sampled twice per bit period and the sampled analog values are transmitted sequentially through the stages of registers 82 and 96.

The PN sequence signal produced by generator 112 is transferred to register 114 and statically stored therein.

The register 114 does not necessarily have the same number of stages as there are bits in the PN sequence. Each of the output lines from the analog shift registers 82 and 96 represent a sample value of a single bit period for the signal passing therethrough. In a preferred embodiment the clock rate causes the input signal to the registers 82 and 96 to be sampled at twice the bit rate. Each of the output lines therefore represents two sample values. Each of the sample analog values in the analog shift registers 82 and 96 are multiplied by the binary value in the local register 114. The outputs of the multipliers connected to the odd numbered taps in shift register 82 are summed with the products from the outputs of the even numbered taps from shift register 96. The summation results can be either positive or negative; therefore, the summation signal is passed through a full wave rectifier such that the same output is produced no matter whether the summation signal is positive or negative. In a like manner the multiplication products associated with the odd numbered taps of shift register 96 are summed with the even numbered taps from shift register 82. The summation can likewise be either positive or negative so it is transmitted to a full wave rectifier to produce the same output no matter the polarity of the input.

The outputs of the full wave rectifiers 116 and 118 are provided to a summing circuit which produces an output when either a positive or a negative signal is applied to either of the full wave rectifiers 116 or 118.

When an incoming PN sequence is in phase alignment with the local oscillator signal present on line 74 a positive phase correlation pulse will be produced at the output of summation circuit 115. If the incoming signal is 90° shifted from the local oscillator signal on line 74, that is, in phase with the signal on line 76, a positive correlation pulse will be produced at the output of summation circuit 117. But if the incoming signal is 180° out of phase with the signal on line 74 a negative correlation pulse will be produced at the output of summation circuit 115. In a like manner a negative correlation pulse will be produced at the output of summation circuit 117 if the incoming PN sequence is 180° out of phase with the signal on line 76. Further, if the incoming signal is at any phase relation other than quadrature with the local oscillator signal, proportional reduced amplitude correlation signals will be produced on both channels at the outputs of summation circuits 115 and 117. By inputing the outputs from the two channels to the full wave rectifiers 116 and 118 and providing the outputs from the rectifiers to the summation circuit 122 there will be produced on line 126 a series of correlation pulses for each correlation of the transmitted PN sequence with the PN sequence stored in register 114. Binary information can be transmitted through the system by the presence or absence of a correlation pulse or by the polarity of the correlation pulse.

Figure 4:
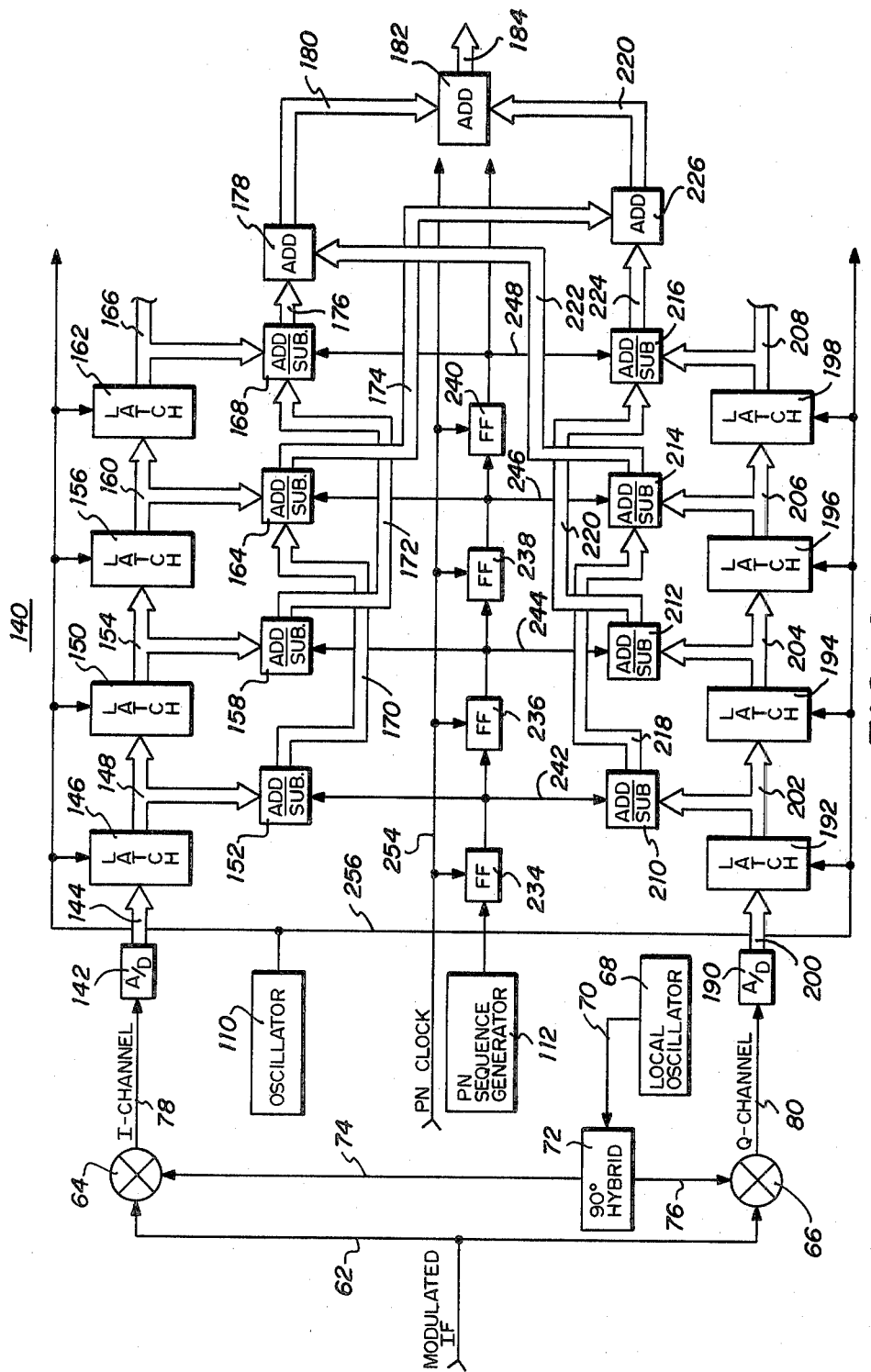
FIG. 4 is a block-schematic diagram of a digital version of a transversal correlator in accordance with the present invention.

A further embodiment of the present invention which utilizes digital circuitry is illustrated in FIG. 4 and shown generally by the reference numeral 140. The embodiment illustrated in FIG. 4 is essentially a digital equivalent to the embodiment 60 illustrated in FIG. 3. The circuit elements for generating the I and Q channel signals are the same. In this embodiment the I channel signal on line 78 is input to an analog-to-digital converter 142. The converter 142 produces a digital word which is transmitted through a path 144 to a latch 146. The latch 146 holds a digital word which is transmitted through a path 148 to another latch 150 and to an add-/subtract unit 152. The latch 150 likewise holds a digital word which is transmitted through a path 154 to a latch 156 and to an add/subtract circuit 158. The latch 156 holds the digital word which is transmitted through a path 160 to a latch 162 and to an add/subtract unit 164. The latch 164 likewise holds a digital word which can be transmitted through a path 166 to other latches and to an add/subtract unit 168.

The digital output of add/subtract unit 152 is connected through a path 170 to the add/subtract unit 164. The add/subtract unit 158 has the output thereof transmitted through a path 172 to an input of the add/subtract unit 168. Unit 164 transmits the output thereof through a path 174 while unit 168 transmits it output through a path 176 to an addition unit 178. The sum produced by unit 178 is transmitted through a path 180 to another addition unit 182. The digital output of circuit 140 is transmitted through a path 184.

The segment of circuit 140 which receives the Q-channel signal on line 180 is essentially similar to that described above for the I-channel signal. The Q-channel signal is provided to the input of an analog-to-digital converter 190. The output of converter 190 is transmitted serially to latches 192, 194, 196 and 198 through respective paths 200, 202, 204, 206 and 208 connected to the output of latch 198. Add/subtract units 210, 212, 214 and 216 are connected respectively to the paths 202, 204, 206 and 208. Unit 210 transmits the digital output thereof through a path 218 to supply an input to the unit 214. Unit 212 likewise provides the output thereof through a path 220 to provide an input to the add/subtract unit 216. The output of add/subtract unit 214 is provided through a path 220 to provide a second input to the add circuit 178. The output from unit 216 is provided through a path 224 to supply first input to an add circuit 226 which receives a second input through the path 174 from unit 164. The summation digital signal produced by unit 226 is transmitted through a path 228 to supply a second input to the add circuit 182.

The PN sequence generator 112 provides the output thereof sequentially through flip-flop circuits 234, 236, 238 and 240. The output of flip-flop 234 is provided through control lines 242 to add/subtract units 152 and 210. The output of flip-flop 236 is provided through a control line 244 to add/subtract units 158 and 212. The output of flip-flop 238 is provided through a control line 246 to add/subtract units 164 and 214. Likewise the output of flip-flop 240 is transmitted through a control line 248 to control the add/subtract units 168 and 216.

The PN digital sequence is loaded into the flip-flops 234, 236, 238, 240 and others by the operation of a PN clock signal which is received over a line 254.

The oscillator 110 produces a clock signal which is provided to shift the digital words produced by the converters 142 and 190. The clock signal is transmitted through a line 256 to the latches 146, 150, 156, 162, 192, 194, 196 and 198.

Operation of the correlator 140 is now described in reference to FIG. 4. The I and Q-channel signals are digitized by the converters 142 and 190 to produce a series of samples which are transmitted serially through the latches following the converters. The defined digital PN sequence is produced by the generator 112 and statically stored in the flip-flops 234, 236, 238 and 240. The stored bits of the PN sequence control the add/subtract mode of the add/subtract units connected thereto.

The digital samples are shifted from one latch to the next latch at each clock cycle of the oscillator 110. Each of the alternate samples for the I-channel and a group of alternate samples for the Q-channel are summed together by the addition unit 178. The remaining alternate samples for the I and Q-channels are summed by the addition unit 226. In the embodiment illustrated the even samples in the I-channel are summed with the odd samples in the Q-channel to produce a summation signal at the output of the addition circuit 178. The odd samples in the I-channel are summed with the even samples in the Q-channel to produce a summation signal at the output of the addition circuit 226. The two summation signals are provided to the addition circuit 182 to produce a correlation output signal on the path 184. The maximum amplitude of the output signal is produced when the PN sequence in the flip-flops is correlated with the PN sequence in either or both of the I and Q-channel samples. When the PN sequence is not correlated with the samples the amplitude of the output of circuit 182 will be a minimum.

The latches in the I and Q-channels can be multi-bit digital shift registers.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. A transversal correlator for demodulating a phase shift keyed (PSK) signal, comprising:
    means for producing quadrature I-channel and Q-channel signals derived from said PSK signal;
    means for sampling said I-channel and said Q-channel signals to produce sequential samples;
    means for storing a plurality of said samples for each of said I and Q-channel signals;
    means for storing a plurality of bits comprising a selected digital code sequence;
    means for correlating said digital code sequence with alternate samples of said I and Q-channel signals in said means for storing to produce a first summation signal;
    means for correlating said digital sequence with the remaining alternate samples in said means for storing to produce a second summation signal; and
    means for combining said first and said second summation signals to produce a correlation output signal.

2. The transversal correlator recited in claim 1 wherein said means for sampling produces analog samples and said means for storing comprises an analog shift register for storing said analog samples.

3. The transversal correlator recited in claim 1 wherein said means for sampling produces digital samples and said means for storing comprises a plurality of serially connected latches for storing said digital samples.

4. A transversal correlator for demodulating an alternate phase shift keyed (PSK) signal, comprising:
    means for mixing the PSK signal with a first reference signal to produce an I-channel signal;
    means for mixing the PSK signal with a second reference signal, which is phase shifted from said first reference signal, to produce a Q-channel signal;
    a first analog shift register connected to receive said I-channel signal and shift sequential samples of said I-channel signal through the cells thereof;
    a second analog shift register connected to receive said Q-channel signal and shift sequential samples of said Q-channel signal through, the cells thereof;
    means for producing a pseudorandem noise (PN) digital sequence;
    a local register for storing at least a part of said PN digital sequence, said local register having cells, each of which corresponds to a cell of said first analog shift register and a cell of said second analog shift register;
    means for multiplying the analog samples in each cell of said analog shift register by the digital quantity in the corresponding cell of said local register to produce a product quantity for each of the cells of the analog shift registers;
    means for summing the product quantities corresponding to alternate cells of each of said first and second analog shift register to produce a first summation signal;
    means for summing the product quantities corresponding to the remaining alternate cells of each of said first and second analog shift registers to produce a second summation signal; and
    means for summing said first and said second summation signals to produce a correlation output signal.

5. The transversal correlator recited in claim 4 wherein the even cells of said first analog shift register are summed with the odd cells of said second analog shift register to produce said first summation signal and the odd cells of said first analog shift register are summed with the even cells of said second analog shift register to produce said second summation signal.

6. The transversal correlator recited in claim 4 including a first full wave rectifier connected to receive and rectify said first summation signal and supply the rectified first summation signal to said means for summing said first and second summation signals and a second full wave rectifier connected to receive and rectify said second summation signal and supply the rectified second summation signal to said means for summing said first and second summation signals.

7. The transversal correlator recited in claim 4 wherein said means for multiplying comprises a mixer for each cell of each of said analog shift registers, each mixer having the sample in the corresponding cell of the analog shift register as a first input and the digital state in the corresponding cell of the local register as the second input and producing said product quantity at the output thereof.

8. A method for demodulating a phase shift keyed (PSK) signal, comprising the steps of:
    producing quadrature I-channel and Q-channel signals derived from said PSK signal;
    sampling each of said I-channel and Q-channel signals to produce sequential samples;
    storing a plurality of said samples for said I-channel and said Q-channel signals;
    storing a selected digital code sequence comprising a series of bits;
    correlating said digital code sequence with alternate samples of said I and Q-channel signals to produce a first summation signal;
    correlating said digital code sequence with the remaining alternate samples of said I and Q-channel signals to produce a second summation signal; and
    summing said first and second summation signals to produce a correlation output signal.

9. The method recited in claim 8 wherein the even samples of said I-channel signal and the odd samples of said Q-channel signal are correlated with the digital code sequence to produce said first summation signal and the odd samples of said I-channel signal and the even samples of said Q-channel signal are correlated with said digital code sequence to produce said second summation signal.

10. The method recited in claim 8 wherein the steps of correlating comprise adding or subtracting each of the samples within each group of alternate samples according to the states of the bits in said digital code sequence.

11. The method recited in claim 8 wherein the step of sampling comprises producing analog samples and the step of storing said samples comprises storing said analog samples in an analog shift register.

12. The method recited in claim 8 wherein the step of sampling comprises producing digital samples and the step of storing a plurality of said samples comprises storing said digital samples in a digital shift register.

13. A method for demodulating a carrier signal which has been phase modulated with a binary signal which has a predetermined code sequence, comprising the steps of:
    generating a local oscillator signal;

phase shifting said local oscillator signal to generate a quadrature local oscillator signal;

mixing said carrier signal with said local oscillator signal to produce an in-phase, I-channel, signal;

mixing said carrier signal with said quadrature local oscillator signal to produce a quadrature, Q-channel, signal;

sampling said I-channel signal and supplying the samples produced thereby to a first analog shift register having an output tap for each stage;

sampling said Q-channel signal and supplying the samples produced thereby to a second analog shift register having an output tap for each stage;

locally generating a digital signal comprising at least a part of said predetermined code sequence;

storing said locally generated digital signal in a digital shift register having an output tap for each stage of the register;

multiplying the quantity in each stage of the digital shift register by the quantity in each corresponding stage of the first analog shift register to produce a plurality of first register product signals each corresponding to a stage of said first analog shift register;

multiplying the quantity in each stage of the digital shift register by the quantity in each corresponding stage of the second analog shift register to produce a plurality of second register product signals each corresponding to a stage of said second analog shift register;

summing the product signals derived from alternate taps of said analog shift registers to produce a first summation signal;

summing the product signals derived from the remaining alternate taps of said analog shift registers to produce a second summation signal; and summing said first and second summation signals to produce a correlation output signal.

14. The method recited in claim 14 including the step of full wave rectifying said first and said second summation signals prior to the step of summing said first and second summation signals.

* * * * *